(12) United States Patent
Gulick et al.

(10) Patent No.: US 7,131,035 B2
(45) Date of Patent: Oct. 31, 2006

(54) SERIAL BUS HOST CONTROLLER DIAGNOSIS

(75) Inventors: Dale E. Gulick, Austin, TX (US); Siegfried Kay Hesse, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 578 days.

(21) Appl. No.: 10/283,612

(22) Filed: Oct. 30, 2002

(65) Prior Publication Data

US 2004/0024920 A1    Feb. 5, 2004

(30) Foreign Application Priority Data

Jul. 31, 2002    (DE)    ................. 102 34 991

(51) Int. Cl.
*G06F 11/00*    (2006.01)
(52) U.S. Cl. .......................................... 714/34; 714/43
(58) Field of Classification Search ................ 714/30, 714/34, 43
See application file for complete search history.

(56) References Cited

U.S. PATENT DOCUMENTS

| | | | |
|---|---|---|---|
| 4,387,423 A * | 6/1983 | King et al. .................... 714/34 |
| 6,119,194 A | 9/2000 | Miranda et al. | |
| 6,122,676 A * | 9/2000 | Brief et al. ..................... 710/9 |
| 6,338,109 B1 * | 1/2002 | Snyder et al. ............... 710/310 |
| 6,343,260 B1 * | 1/2002 | Chew .......................... 702/122 |
| 6,393,588 B1 * | 5/2002 | Hsu et al. ...................... 714/43 |
| 6,829,726 B1 * | 12/2004 | Korhonen .................... 714/25 |

FOREIGN PATENT DOCUMENTS

EP    1031931    1/2000

OTHER PUBLICATIONS

"Enhanced Host Controller Interface Specification for Universal Serial Bus, Rev. 1.0", Intel Corporation, US, Mar. 12, 2002, pp. 13-30 and pp. 135-145.

\* cited by examiner

*Primary Examiner*—Scott Baderman
*Assistant Examiner*—Gabriel L. Chu
(74) *Attorney, Agent, or Firm*—Meyertons Hood Kivlin Kowert & Goetzel, P.C.; B. Noël Kivlin

(57) ABSTRACT

A diagnosis mechanism for host controllers such as USB (Universal Serial Bus) host controllers is provided. The host controller has a register set that comprises at least one host controller capability register storing data indicative of operational capabilities of the host controller, and at least one host controller operational register storing data for controlling the operation of the host controller. The at least one host controller capability register stores data that is indicative of available diagnostic modes that the host controller can enter. The at least one host controller operational register stores diagnosis data for controlling the operation of the USB host controller in diagnostic modes. This diagnosis mechanism may improve the reliability of the host controller operation.

65 Claims, 6 Drawing Sheets

SERIAL BUS HOST CONTROLLER DIAGNOSIS

BACKGROUND OF THE INVENTION

1. Field of the Invention

The invention generally relates to host controllers such as USB (Universal Serial Bus) host controllers and related methods, and in particular to host controllers for handling the data traffic between at least one peripheral device and a computer system.

2. Description of the Related Art

USB was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB 2.0 systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierachially by defining several layers as shown in the figure.

In the upper most layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system. The host controller drivers 210, 220 provide a software layer between a specific hardware 215, 225, 230 and the USB driver 205 for providing a driver-hardware interface.

While the layers discussed so far are software implemented, the upper most hardware component layer includes the host controllers 215, 225. These controllers are connected to the USB device 230 that performs the end user function. Of course, for one given USB device, the device is connected to either one of the host controllers 215, 225 only.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 usually is a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-and-play support, controls a PCI-ISA (Industry Standard Architecture) bridge, manages the keyboard/mouse controller, provides power management features, and controls other peripherals.

USB host controllers and other host controllers in southbridges or I/O hubs are hardware components that are extremely complex in structure. Thus, there may occur faults in the operation of such host controllers, and it is usually difficult to resolve whether such faults are caused by hardware components or by the software driver or any other hardware or software component. For this reason, conventionally host controllers may often lack reliability.

SUMMARY OF THE INVENTION

Improved host controllers, computer systems and related methods are provided that may increase the overall operational reliability.

In one embodiment, a USB host controller for handling the data traffic between at least one USB device and a computer system is provided. The host controller has a register set that comprises at least one host controller capability register storing data indicative of operational capabilities of the USB host controller, and at least one host controller operation register storing data for controlling the operation of the USB host controller. The at least one host controller capability register stores data indicative of available diagnostic modes that the USB host controller can enter. The at least one host controller operational register stores diagnosis data for controlling the operation of the USB host controller in diagnostic modes.

In another embodiment, there may be provided a host controller for controlling the data traffic to and from at least one peripheral device connected to a computer system over a serial bus. The host controller has a register set comprising at least one host controller capability register storing data indicative of operational capabilities of the host controller, and at least one host controller operational register storing data for controlling the operation of the host controller. The at least one host controller capability register stores data indicative of available diagnostic modes that the host controller can enter. The at least one host controller operational register stores diagnosis data for controlling the operation of the host controller in diagnostic modes.

In a further embodiment, a method of operating a USB host controller for handling the data traffic between at least one USB device and a computer system is provided. The USB host controller has a register set. The method comprises storing data indicative of operational capabilities of the USB host controller in at least one host controller capability register, and storing data for controlling the operation of the USB host controller in at least one host controller operational register. The data indicative of operational capabilities comprises data indicative of available diagnostic modes that the USB host controller can enter. The data for controlling the operation of the USB host controller comprises diagnosis data for controlling the operation of the USB host controller in diagnostic modes.

In still a further embodiment, there is provided a method of operating a host controller for controlling the data traffic to and from at least one peripheral device connected to a computer system over a serial bus. The host controller has a register set. The method comprises storing data indicative of operational capabilities of the host controller in at least one host controller capability register, and storing data for controlling the operation of the host controller in at least one host controller operational register. The data indicative of operational capabilities comprises data indicative of available diagnostic modes that the host controller can enter. The data for controlling the operation of the host controller comprises diagnosis data for controlling the operation of the host controller in diagnostic modes.

In still a further embodiment, a computer system is provided that comprises a host controller for controlling the data traffic to and from at least one peripheral device that is connected to the computer system over a serial bus. The host controller has a register set that comprises at least one host controller capability register storing data indicative of operational capabilities of the host controller, and at least one host controller operational register storing data for controlling the operation of the host controller. The at least one host controller capability register stores data indicative of available diagnostic modes that the host controller can enter. The at least one host controller operational register stores diagnosis data for controlling the operation of the host controller in diagnostic modes.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
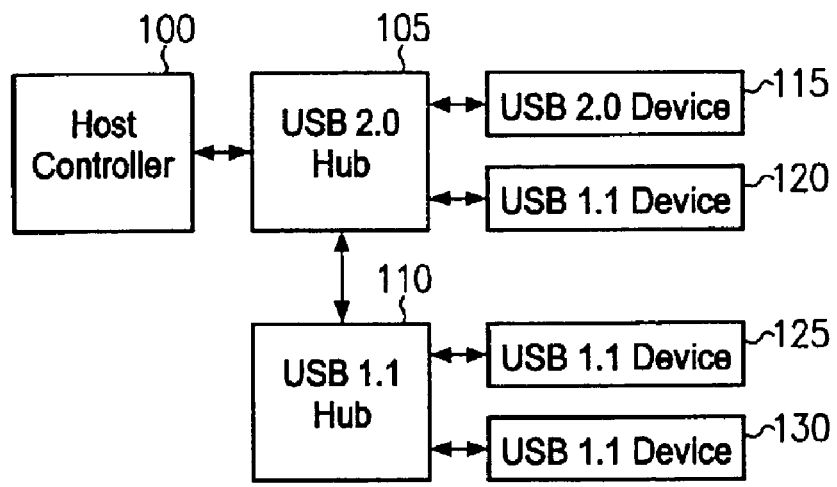
FIG. 1 illustrates an example USB 2.0 compliant system.
Figure 2:
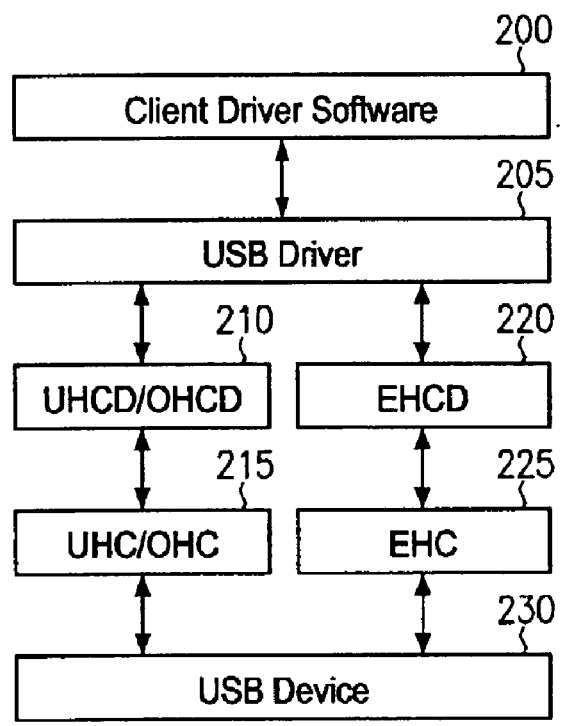
FIG. 2 illustrates the hardware and software component layers in the system of FIG. 1.
Figure 3:
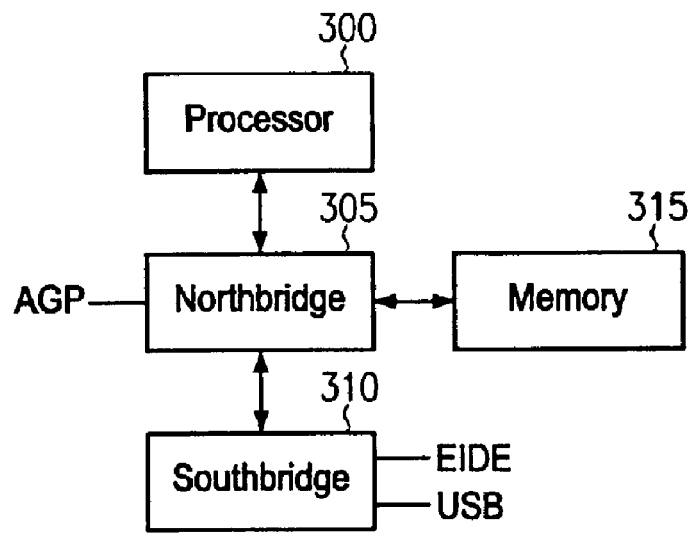
FIG. 3 illustrates a common motherboard layout.
Figure 4:
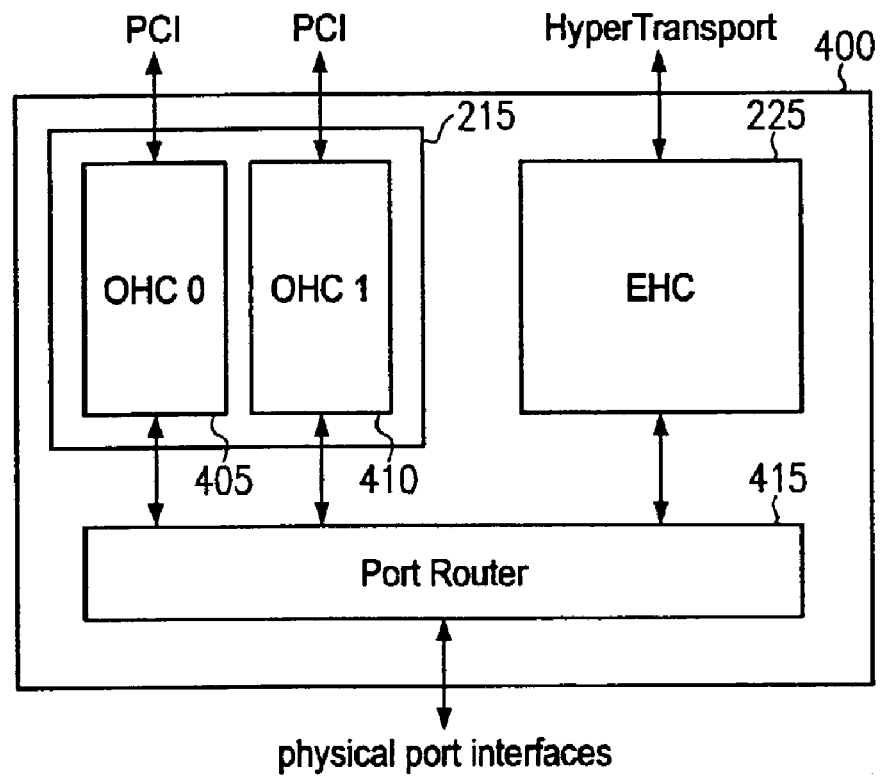
FIG. 4 illustrates the main components of the USB 2.0 compliant host controller according to an embodiment.

Referring now to the drawings and particularly to FIG. 4, the main components of a USB 2.0 compliant host controller 400 according to an embodiment are shown. In general, the host controller comprises three main components: the enhanced host controller (EHC) 225, one or more companion host controllers 215, and the port router 415.

The enhanced host controller 225 handles the USB 2.0 high speed traffic. Additionally, it controls the port router 415.

In the companion host controller unit 215 of the present embodiment, there are two OHCI compliant host controllers, OHC0 405 and OHC1 410. These controllers handle all USB 1.1 compliant traffic and may contain the legacy keyboard emulation for non-USB aware environments.

The port router 415 assigns the physical port interfaces their respective owners. This ownership is controlled by EHC registers, and per default all ports are routed to the companion host controllers in order to allow for a system with only USB 1.1 aware drivers to function. If a USB 2.0 aware driver is present in the system it will assign the ports to either a companion host controller 405, 410 for low and full speed devices and hubs (USB 1.1 traffic) or to the EHC 225 for high speed devices and hubs.

That is, the USB 2.0 host controller shown in FIG. 4 complies with the EHCI specification and allows for using existing OHCI USB 1.1 host controllers with the minimum alteration necessary to interface to the port router block 415, instead of USB 1.1 physical devices.

Plug-and-play configuration may be handled separately by each host controller 405, 410, 225. There may be an EHCI-imposed restriction that the OHCI controllers 215 must have lower function numbers than the EHCI controller 225.

The USB 2.0 compliant host controller of FIG. 4 may be defined as hardware architecture to implement an EHCI-compliant host controller for integration into a southbridge 310. The host controller then resides between the USB-2 analog input/output pins and a link interface module for interfacing upstream towards system memory, e.g. interfacing to a northbridge if there is one present in the system. This interface may be an internal HyperTransport™ interface. The HyperTransport technology is a high speed, high performance point-to-point link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy PC buses, to be extensible to new system network architecture buses, to be transparent to operating systems, and to offer little impact on peripheral drivers.

Thus, in the embodiment of FIG. 4 a HyperTransport-based USB host controller is provided where an enhanced host controller 225 is responsible for handling all high speed USB traffic as well as controlling port ownership for itself and the companion controllers 215 via the port router 415. After power-on reset or software-controlled reset of the EHC 225, it may default to a state where all ports are owned and controlled by the companion host controllers 215, all operational registers are at their respective default values, and the EHC 225 is halted, i.e. it neither fetches descriptors from system memory 315 nor issues any USB activity. In normal operation, the EHC 225 may process asynchronous and interrupt transfers from a periodic list, bulk and control from an asynchronous list. Either list can be empty or its processing disabled by software.

Figure 5:
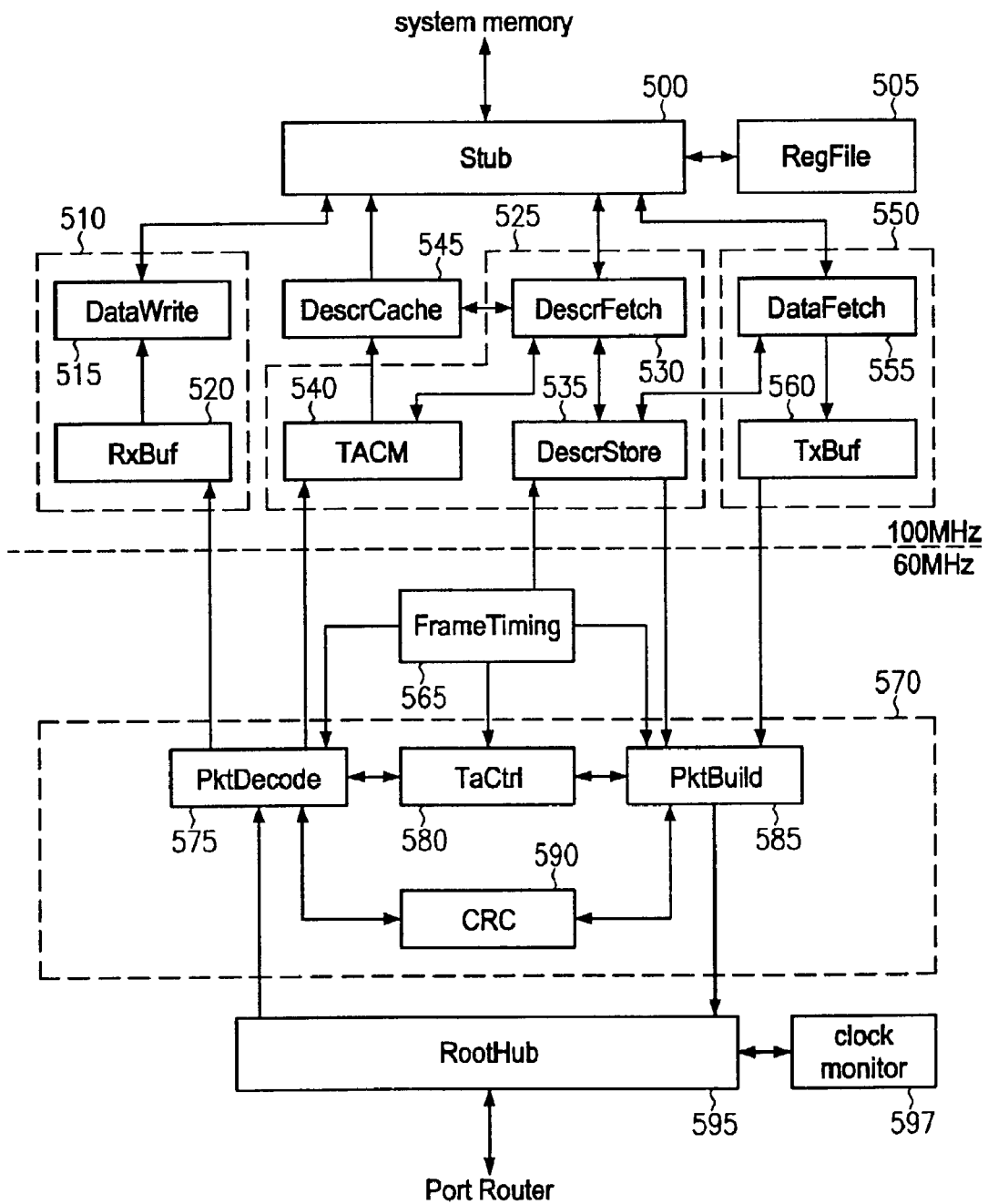
FIG. 5 is a block diagram illustrating the components of the enhanced host controller that is a component of the arrangement of FIG. 4.

Turning now to FIG. 5, the components of the enhanced host controller EHC 225 are depicted in more detail. As can be seen from the figure, the enhanced host controller 225 can be divided into a 100 MHz core clock domain and a 60 MHz clock domain. While the 60 MHz clock domain includes the circuitry for routing transactions to physical devices, the 100 MHz clock domain does the actual descriptor processing. It is to be noted that in other embodiments, the domains may have clock rates different from the above values of 100 MHz and 60 MHz. In these embodiments, the descriptor processing domain clock still has a frequency at least as high as the other domain, or higher.

In the 100 MHz domain, handling of the data traffic to and from the system memory is done by the stub 500. The stub 500 assigns the internal sources and sinks to respective HyperTransport streams, i.e. posted requests, non-posted requests, responses. The stub 500 arbitrates the internal HyperTransport interface between all internal bus masters, i.e. the receive DMA (Direct Memory Access) engine 510, the descriptor cache 545, the descriptor processing unit 525 and the transmit DMA engine 550. Thus, the stub 500 arbitrates between descriptor fetching, writing descriptors back, receiving and transmitting data.

The stub 500 is connected to a register file 505 that contains the EHCI registers. In the present embodiment, the EHCI registers store data with respect to the PCI configuration, the host controller capabilities and the host controller operational modes.

The descriptor processing unit 525 is connected to stub 500 and comprises three subunits: the descriptor fetching unit (DescrFetch) 530, the descriptor storage unit (DescrStore) 535 and the transaction completion machine (TACM) 540. The descriptor fetching unit 530 determines, based on timing information and register settings, which descriptor is to be fetched or prefetched next and sends the request to the stub 500 and/or to the descriptor cache 545. When it receives the descriptor it sends it to the descriptor storage unit 535.

The descriptor storage unit 535 holds the prefetched descriptors. By performing storage management, its main function is to provide a storage capacity to average memory access legacies for descriptor fetches.

The transaction completion machine 540 is connected to the descriptor fetching unit 530 for managing the status write-back to descriptors. For this purpose, the transaction completion machine 540 is connected to the descriptor cache 545.

This cache contains descriptors which have been prefetched by the descriptor fetching unit 530 for fast re-access. The descriptors held in the descriptor cache 545 are updated by the transaction completion machine 540 and eventually written back to system memory, via stub 500. The descriptor cache 545 may be fully associative with write-through characteristics. It may further control the replacement of the contents dependent on the age of the stored descriptors.

As apparent from FIG. 5, there are further provided the transmit DMA engine 550 and the receive DMA engine 510. The transmit DMA engine 550 comprises a data fetching unit (DataFetch) 555 and a data transmit buffer (TxBuf) 560. The data fetching unit 555 is the DMA read bus master and inspects the entries in the descriptor storage unit 535 of the descriptor processing unit 525. The data fetching unit 555 prefetches the corresponding data and forwards it to the data transmit buffer 560.

The data transmit buffer 560 may be a FIFO (first in first out) buffer, and its function corresponds to that of the descriptor storage unit 535 in that it allows to prefetch enough data for outgoing transactions to cover the memory system latency. The data transmit buffer 560 may further serve as clock domain translator for handling the different clocks of the domains.

The receive DMA engine 510 comprises the data writing unit (DataWrite) 515 which serves as DMA write bus master unit for moving the received data that are stored in the data receive buffer (RxBuf) 520, to its respective place in system memory. The data receive buffer 520 may be a simple FIFO buffer and may also serve as clock domain translator.

In the 60 MHz clock domain, there is provided a frame timing unit (Frame-Timing) 565 that is the master USB time reference. One clock tick of the frame timing unit corresponds to an integer (e.g. 8 or 16) multiple of USB high speed bit times. The frame timing unit 565 is connected to the descriptor storage unit 535 and to the packet handler block 570.

The packet handler block 570 comprises a packet building unit (PktBuild) 585 that constructs the necessary USB bus operations to transmit data and handshakes, and a packet decoder (PktDecode) 575 that disassembles received USB packets. Further, a transaction controller (TaCtrl) 580 is provided that supervises the packet building unit 585 and the packet decoder 575. Further, the packet handler 570 comprises a CRC (cyclic redundancy check) unit 590 for generating and checking CRC data for transmitted and received data.

The packet building unit 585 and the packet decoder 575 of the packet handler 570 are connected to the root hub 595 that contains port specific control registers, connect detection logic and scatter/gather functionality for packets between the packet handler 570 and the port router.

Moreover, a clock monitoring unit 597 is provided in the embodiment of FIG. 5. The clock monitoring unit 597 is connected to the root hub 595 and monitors the clock used for handling the data traffic to and from the USB devices. By means of the clock monitoring unit 597, the host controller 225, together with the port router 415 and the physical USB 2.0 devices, provide low-level test features to test basic structural integrity. In detail, the clock monitoring unit 597 monitors a USB device reference clock (48 MHz reference clock divided by 8), and/or a PLL (Phased Locked Loop) output clock (60 MHz common physical device clock divided by 10). Moreover, the clock monitoring unit 597 of the present embodiment monitors a PLL lock signal. The clock monitoring unit 597 may comprise test/diagnostic registers for controlling the monitoring mechanism.

Turning now back to the discussion of the register file 505, it has already been mentioned that the register file 505 of the present embodiment contains the EHCI registers storing data with respect to the PCI configuration, the host controller capabilities, and the host controller operational modes. This will now be discussed in more detail with reference to FIG. 6 which depicts the register components of the register file 505.

Figure 6:
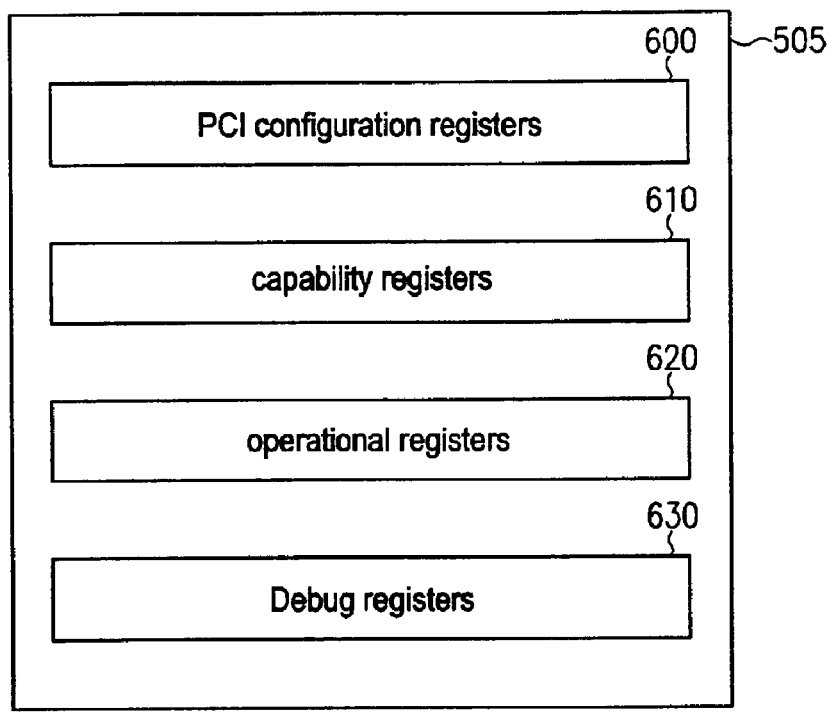
FIG. 6 is a block diagram illustrating registers in the register file that is a hardware component of the arrangement of FIG. 5.

As apparent from FIG. 6, the register file 505 comprises PCI configuration registers 600. These registers may store device and vendor identifiers, USB status and command data, USB class and revision identifiers, data relating to BIST (Built-In Self-Test), the header, latency and cache line size, memory addresses and so on. Further, the PCI configuration registers 600 may comprise PCI power management registers and registers relating to USB legacy capabilities.

Figure 7:
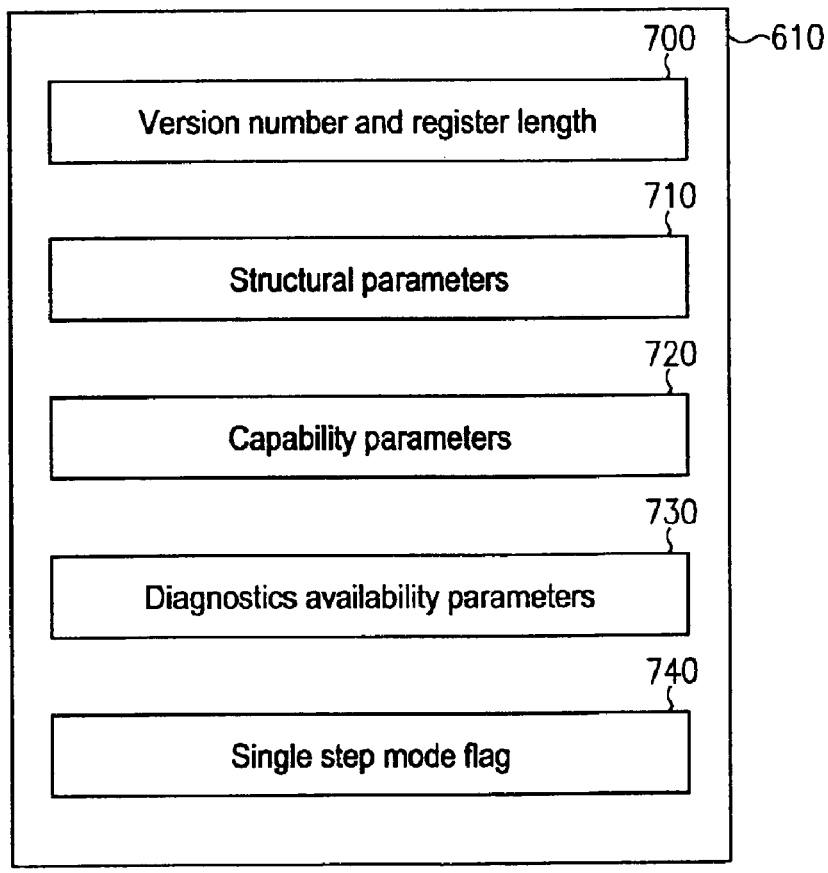
FIG. 7 illustrates the contents of the capability registers in the register file of FIG. 6.

In addition to the PCI configuration registers 600, the register file 505 further comprises capability registers 610 storing data as indicated in FIG. 7. The capability registers may comprise EHC capability registers and additional capability registers which are an extension to the EHC features and which are transparent to EHC non-aware software.

For instance, there may be data 700 stored indicating an interface version number and a capability registers length. Further, structural parameters 710 may be stored such as the number of companion controllers, if available, the number of ports supported per companion host controller, and so on.

Capability parameters 720 stored in the capability registers 610, may indicate whether extended host controller capabilities are implemented. Moreover, data for updating an isochronous schedule may be stored. In addition, data relating to an asynchronous schedule may be stored.

As can be seen from FIG. 7, the capability registers 610 of the present embodiment further store diagnostics availability parameters 730 that indicate available diagnostic modes that the USB host controller can enter. Further, a single step mode flag 740 may be provided for indicating that one of the available diagnostic modes is a single step mode in which the USB host controller is forced to process a single transaction at a time. This will be discussed in more detail below.

Figure 8:
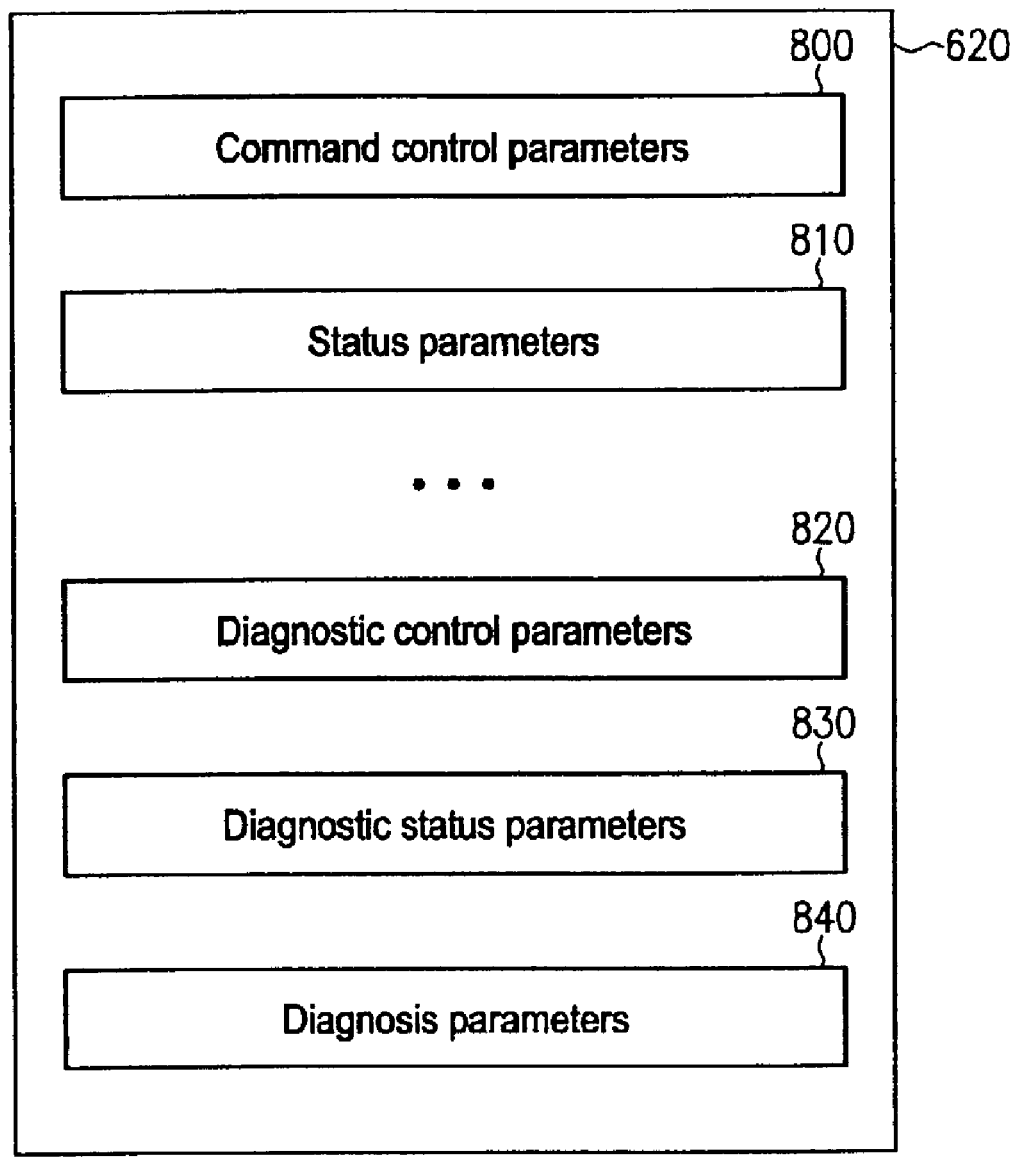
FIG. 8 illustrates the contents of the operational register in the register file of FIG. 6.

Turning now back to FIG. 6, the register file 505 further comprises operational registers 620 that store parameters as illustrated in FIG. 8. Again, the operational registers may comprise EHC operational registers and other operational registers. The registers may store command control parameters 800 such as data allowing system software to select the maximum rate at which the host controller will issue interrupts, park mode data, periodic and asynchronous schedule enable data, host controller reset data and so on. Further, status parameters 810 may be stored that relate to the periodic and asynchronous schedule, to errors and interrupts etc. There may be other parameters stored in the operational registers 620, such as interrupt enable data, frame index data, port status and control data, and so on.

In addition, the operational registers 620 of the register file 505 store diagnostic control parameters 820, diagnostic status parameter 830, and diagnosis parameters 840. The diagnostic control parameters 820 may be used to control the operation of the USB host controller in diagnostic modes. It is to be noted that the host controller may be operated in one of the available diagnostic modes indicated by the diagnostics availability parameters 730, or may be operated in diagnostic modes that are available at any time without having corresponding data stored in the capability registers 610.

The diagnostic status parameters 830 may store data relating to reception errors, line states and connection states. The diagnosis parameters 840 store data that is used in diagnostic modes or that results from operating the host controller in one of the diagnostic modes, when the host controller is controlled according to the diagnostic control parameters 820.

Turning now back to FIG. 6, the register file 505 further comprises debug registers 630 storing information that is relevant when operating the host controller in a debug mode, such as status information relating to the debug process, and so on.

Thus, the host controller of the present embodiment is provided with various diagnostic mechanisms for improving reliability of the overall host controller operation. Besides the above mentioned clock monitoring, the diagnostic mechanisms include a single step mechanism, an error force mode, an end-of-microframe dead time diagnosis, various time accounting diagnosis modes, and a debug mode. These diagnosis mechanisms will now be discussed in more detail.

As already mentioned above, the capability registers comprise a single step mode flag 740 that indicates that one of the available diagnostic modes is a single step mode. In the single step mode, the USB host controller is forced to process a single transaction (or descriptor) at a time. The USB host controller may be adapted to process a first list of transactions periodically and a second list of transactions asynchronously, where the single step mode applies to only the asynchronous list. The diagnostic control parameters 820 may comprise a single step mode enable flag that indicates whether the USB host controller is presently operating in the single step mode. The enable flag is software re-writeable if the single step mode flag 740 is set. Otherwise, the enable flag is read-only.

The diagnostic control parameters 820 may further store an activity flag that indicates whether the USB host controller is presently processing a transaction when operating in the single step mode. No other transaction can be started if both the enable flag and the activity flag are set.

In another embodiment, the USB host controller may be adapted to apply a handshake mechanism to step from one transaction to the next one in the single step mode.

In any embodiment, the single step mode may be useful for both debugging and as a fall back to deal with specification compatibility and interworking issues with hubs and devices. That is, the host controller may be adapted to enter the single step mode in a software debug mode of the host controller, and/or in a predefined compatibility mode of the host controller.

Another diagnostic mode that may be available in the host controller of the present embodiment, is an error force mode. The host controller operational registers 620 may store an error force mode flag as one of the diagnostic control parameters 820, indicating that one of the available diagnostic modes is an error force mode. In the error force mode, the USB host controller is forced to deliberately corrupt the CRC (Cyclic Redundancy Check) value of every outgoing data packet. Moreover, an error assume mode may be set using an error assume mode flag 820, where the USB host controller is forced to treat every incoming data packet as having a corrupt CRC value. In much the same way, an error ignore mode flag 820 may indicate that the USB host controller operates in an error ignore mode where it is forced to treat every incoming data packet as having a correct CRC value.

A further diagnostic mode that may be available in the host controller, makes use of end-of-microframe dead time diagnosis data that indicates the time at the end of the previous microframe not used for USB transactions. By means of such an end-of-microframe dead time reporting register 840, the number of asynchronously scheduled descriptors may be controlled that are prefetched based on their estimated time to complete.

Other diagnostic modes relate to the queue, cache and buffer mechanisms, in particular with respect to asynchronous descriptors. For instance, the operational registers 620 may store time accounting diagnosis data 840 that indicates an estimated completion time of all asynchronously scheduled transfers of the previous microframe that are stored in a queue of the descriptor storage unit 535 but that are not yet executed. Other diagnosis parameters 840 may include maximum time diagnosis data 840 that indicates a maximum value for an estimated completion time of asynchronously scheduled transfers of the previous microframe. In addition, minimum time diagnosis data may be stored for indicating a minimum value for the estimated completion time of asynchronously scheduled transfers of the previous microframe.

There may also be stored time accounting diagnosis data that indicates an estimated completion time of all enqueued transfers of the current microframe. The host controller operation registers 620 may further store threshold diagnosis data 840 indicating an estimated completion time threshold value that may be used to control the number of asynchronously scheduled descriptors that are prefetched based on their estimated time to complete.

Referring to the descriptor storage unit 535 that stores fetched descriptors, the host controller operational register 620 may store flush diagnosis data instructing the host controller to flush the stored descriptors. Further, the operational registers 620 may store diagnosis data 840 that indicates operational parameters of the descriptor storage unit 535 such as load levels and boundary values.

With respect to the descriptor cache 545 that stores prefetched descriptors, the diagnosis parameters 840 may comprise flush diagnosis data instructing the host controller to flush the stored descriptors. Again, the operational registers 620 may further store diagnosis data 840 indicating operational parameters of the descriptor cache 545, such as the number of currently cached descriptors.

As mentioned above, the transmit and receive engines 550, 510 comprise FIFO buffers 560, 520. The operational register 620 may store flush diagnosis data 840 instructing the host controller to flush one or both of the FIFO buffers 560, 520. Further, diagnosis data 840 may be stored that indicates the current number of bytes in one or both FIFO buffers.

As apparent from the above description of the embodiments, various diagnostic modes are available for improving the overall operational reliability of the host controller. An example of how the diagnostic modes can be used, will now be explained with reference to FIG. 9.

Figure 9:
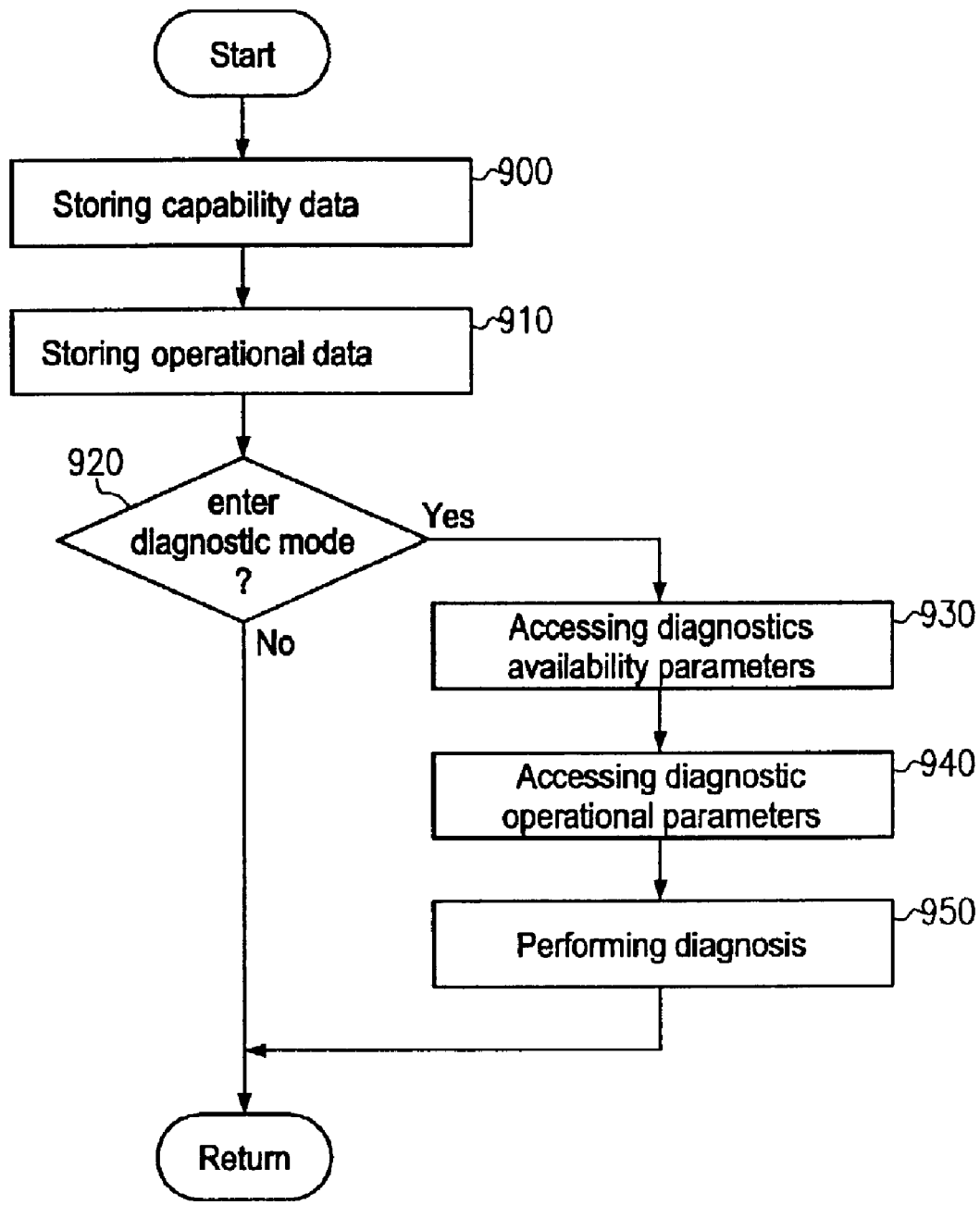
FIG. 9 is a flowchart illustrating the process of using the registers for diagnostic purposes according to an embodiment.

In the process depicted in the flowchart of FIG. 9, capability data and EHC operational data are stored in steps 900 and 910. It is to be noted that storing the data may in another embodiment be done completely independently and separately from the remaining steps shown in FIG. 9. Storing the data may include updating the data, or copying the data from other sources.

In step 920, the host controller determines whether to enter a diagnostic mode. This may be done in reply to software instructions. In another embodiment, the decision of whether to enter one of the diagnostic modes may be done hardwired in certain cases, e.g., if a predefined error condition is fulfilled.

When entering one of the diagnostic modes in step 920, diagnostics availability parameters 730 may be accessed in step 930 for determining whether the selected diagnostic mode is available in the host controller. It is to be noted that step 930 may be skipped if the chosen diagnostic mode is one of the modes that are available at any time without having diagnostics availability parameters 730 stored in the capability registers 610.

If the chosen diagnostic mode is available, diagnostic operational parameters 820, 830, 840 may be accessed in step 940. The diagnosis is then performed in step 950.

As apparent from the foregoing description of the embodiments, a host controller technique is provided that has efficient diagnostic capabilities and modes and thus, goes beyond the definitions and conventions specified in the EHCI specification.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A USB (Universal Serial Bus) host controller for handling data traffic between at least one USB device and a computer system, the USB host controller having a register set comprising:
   at least one host controller capability register configured to store data indicative of operational capabilities of the USB host controller; and at least one host controller operational register configured to store data for controlling the operation of the USB host controller, wherein said at least one host controller capability register is configured to store data indicative of available diagnostic modes that the USB host controller can enter, wherein said at least one host controller operational register is configured to store diagnosis data for controlling the operation of the USB host controller in diagnostic modes, and wherein said at least one host controller capability register is configured to store a single step mode flag indicating that one of said available diagnostic modes of the USB host controller is a single step mode in which the USB host controller is forced to process a single transaction at a time.

2. The USB host controller of claim 1, wherein:

the USB host controller is configured to process a first list of transactions periodically and a second list of transactions asynchronously, and the USB host controller is forced to process transactions of only the asynchronous list in the single step mode when the single step mode flag is set.

3. The USB host controller of claim 1, wherein said at least one host controller operational register is configured to store an enable flag indicating whether the USB host controller is presently operating in the single step mode.

4. The USB host controller of claim 3, wherein said enable flag is software rewritable if said single step mode flag is set, and is read-only if said single step mode flag is not set.

5. The USB host controller of claim 3, wherein said at least one host controller operational register further is configured to store an activity flag indicating whether the USB host controller is presently processing a transaction when operating in the single step mode, wherein no other transaction can be started if both the enable flag and the activity flag are set.

6. The USB host controller of claim 1, wherein said USB host controller is configured to enter said single step mode in a software debug mode of said USB host controller.

7. The USB host controller of claim 1, wherein said USB host controller is configured to enter said single step mode in a predefined compatibility mode of said USB host controller.

8. The USB host controller of claim 1, wherein said USB host controller is configured to apply a handshake mechanism to step from one transaction to the next one in said single step mode.

9. The USB host controller of claim 1, wherein said at least one host controller operational register is configured to store diagnosis data for controlling the operation of the USB host controller in one of the available diagnostic modes indicated by the data stored in said at least one host controller capability register.

10. The USB host controller of claim 1, wherein said at least one host controller operational register is configured to store diagnosis data for controlling the operation of the USB host controller in diagnostic modes that are available at any time without having corresponding data stored in said at least one host controller capability register.

11. The USB host controller of claim 1, wherein said at least one host controller operational register is configured to store an error force mode flag indicating that one of said available diagnostic modes is an error force mode in which the USB host controller is forced to deliberately corrupt the CRC (Cyclic Redundancy Check) value of every outgoing data packet.

12. The USB host controller of claim 1, wherein said at least one host controller operational register is configured to store an error assume mode flag indicating that one of said available diagnostic modes is an error assume mode in which the USB host controller is forced to treat every incoming data packet as having a corrupt CRC (Cyclic Redundancy Check) value.

13. The USB host controller of claim 1, wherein said at least one host controller operational register is configured to store an error ignore mode flag indicating that one of said available diagnostic modes is an error ignore mode in which the USB host controller is forced to treat every incoming data packet as having a correct CRC (Cyclic Redundancy Check) value.

14. The USB host controller of claim 1, wherein said at least one host controller operational register is configured to store end-of-microframe dead time diagnosis data indicating the time at the end of the previous microframe not used for USB transactions.

15. The USB host controller of claim 14, wherein the USB host controller is configured to use said end-of-microframe dead time diagnosis data to control the number of asynchronously scheduled descriptors that are prefetched based on their estimated time to complete.

16. The USB host controller of claim 1, wherein said at least one host controller operational register is configured to store time accounting diagnosis data indicating an estimated completion time of all asynchronously scheduled transfers of the previous microframe that are stored in a queue but not executed.

17. The USB host controller of claim 1, wherein said at least one host controller operational register is configured to store maximum time diagnosis data indicating a maximum value for an estimated completion time of asynchronously scheduled transfers of the previous microframe.

18. The USB host controller of claim 1, wherein said at least one host controller operational register is configured to store minimum time diagnosis data indicating a minimum value for an estimated completion time of asynchronously scheduled transfers of the previous microframe.

19. The USB host controller of claim 1, wherein said at least one host controller operational register is configured to store time accounting diagnosis data indicating an estimated completion time of all enqueued transfers of the current microframe.

20. The USB host controller of claim 1, wherein said at least one host controller operational register is configured to store threshold diagnosis data indicating an estimated completion time threshold value used to control the number of asynchronously scheduled descriptors that are prefetched based on their estimated time to complete.

21. The USB host controller of claim 1, further comprising:

a descriptor storage unit configured to store fetched descriptors, wherein said at least one host controller operational register is configured to store flush diagnosis data instructing the USB host controller to flush the stored descriptors.

22. The USB host controller of claim 1, further comprising:

a descriptor storage unit configured to store fetched descriptors, wherein said at least one host controller operational register is configured to store diagnosis data indicating operational parameters of said descriptor storage unit.

23. The USB host controller of claim 1, further comprising:
   a descriptor cache configured to store prefetched descriptors,
   wherein said at least one host controller operational register is configured to store flush diagnosis data instructing the USB host controller to flush the stored descriptors.

24. The USB host controller of claim 1, further comprising:
   a descriptor cache configured to store prefetched descriptors,
   wherein said at least one host controller operational register is configured to store diagnosis data indicating the number of currently cached descriptors.

25. The USB host controller of claim 1, further comprising:
   a transmit and receive engine configured to transmit read requests and receive responses thereto, said transmit and receive engine comprising at least one FIFO (First In First Out) buffer,
   wherein said at least one host controller operational register is configured to store flush diagnosis data instructing the USB host controller to flush said at least one FIFO buffer.

26. The USB host controller of claim 1, further comprising:
   a transmit and receive engine configured to transmit read requests and receive responses thereto, said transmit and receive engine comprising at least one FIFO (First In First Out) buffer,
   wherein said at least one host controller operational register is configured to store diagnosis data indicating the current number of bytes in said at least one FIFO buffer.

27. The USB host controller of claim 1, further comprising:
   at least one debug register configured to store debug control data for controlling the USB host controller in a debug mode.

28. The USB host controller of claim 1, further comprising:
   a clock monitoring unit connected to monitor a clock used for handling the data traffic to and from said at least one USB device.

29. The USB host controller of claim 28, wherein said clock monitoring unit is configured to monitor a USB device reference clock.

30. The USB host controller of claim 28, wherein said clock monitoring unit is configured to monitor a PLL (Phase Locked Loop) output clock.

31. The USB host controller of claim 29, wherein said clock monitoring unit is configured to monitor a PLL (Phase Locked Loop) lock signal.

32. A host controller for controlling data traffic to and from at least one peripheral device connected to a computer system over a serial bus, the host controller having a register set comprising:
   at least one host controller capability register configured to store data indicative of operational capabilities of the host controller; and
   at least one host controller operational register configured to store data for controlling the operation of the host controller,
   wherein said at least one host controller capability register is configured to store data indicative of available diagnostic modes that the host controller can enter,
   wherein said at least one host controller operational register is configured to store diagnosis data for controlling the operation of the host controller in diagnostic modes, and
   wherein said at least one host controller capability register is configured to store a single step mode flag indicating that one of said available diagnostic modes of the host controller is a single step mode in which the host controller is forced to process a single transaction at a time.

33. A method of operating a USB (Universal Serial Bus) host controller for handling data traffic between at least one USB device and a computer system, the USB host controller having a register set, the method comprising:
   storing data indicative of operational capabilities of the USB host controller in at least one host controller capability register; and
   storing data for controlling the operation of the USB host controller in at least one host controller operational register,
   wherein said data indicative of operational capabilities comprises data indicative of available diagnostic modes that the USB host controller can enter,
   wherein said data for controlling the operation of the USB host controller comprises diagnosis data for controlling the operation of the USB host controller in diagnostic modes, and
   wherein said data indicative of operational capabilities comprises a single step mode flag indicating that one of said available diagnostic modes of the USB host controller is a single step mode in which the USB host controller is forced to process a single transaction at a time.

34. The method of claim 33, further comprising:
   processing a first list of transactions periodically and a second list of transactions asynchronously, and
   forcing the USB host controller to process transactions of only the asynchronous list in the single step mode when the single step mode flag is set.

35. The method of claim 33, wherein said data for controlling the operation of the USB host controller comprises an enable flag indicating whether the USB host controller is presently operating in the single step mode.

36. The method of claim 35, wherein said enable flag is software rewritable if said single step mode flag is set, and is read-only if said single step mode flag is not set.

37. The method of claim 35, wherein said data for controlling the operation of the USB host controller further comprises an activity flag indicating whether the USB host controller is presently processing a transaction when operating in the single step mode, wherein no other transaction can be started if both the enable flag and the activity flag are set.

38. The method of claim 33, further comprising:
   entering said single step mode in a software debug mode of said USB host controller.

39. The method of claim 33, further comprising:
   entering said single step mode in a predefined compatibility mode of said USB host controller.

40. The method of claim 33, further comprising:
   applying a handshake mechanism to step from one transaction to the next one in said single step mode.

41. The method of claim 33, wherein said data for controlling the operation of the USB host controller comprises diagnosis data for controlling the operation of the USB host controller in one of the available diagnostic modes indicated by the data stored in said at least one host controller capability register.

42. The method of claim 33, wherein said data for controlling the operation of the USB host controller comprises diagnosis data for controlling the operation of the USB host controller in diagnostic modes that are available at any time without having corresponding data stored in said at least one host controller capability register.

43. The method of claim 33, wherein said data for controlling the operation of the USB host controller comprises an error force mode flag indicating that one of said available diagnostic modes is an error force mode in which the USB host controller is forced to deliberately corrupt the CRC (Cyclic Redundancy Check) value of every outgoing data packet.

44. The method of claim 33, wherein said data for controlling the operation of the USB host controller comprises an error assume mode flag indicating that one of said available diagnostic modes is an error assume mode in which the USB host controller is forced to treat every incoming data packet as having a corrupt CRC (Cyclic Redundancy Check) value.

45. The method of claim 33, wherein said data for controlling the operation of the USB host controller comprises an error ignore mode flag indicating that one of said available diagnostic modes is an error ignore mode in which the USB host controller is forced to treat every incoming data packet as having a correct CRC (Cyclic Redundancy Check) value.

46. The method of claim 33, wherein said data for controlling the operation of the USB host controller comprises end-of-microframe dead time diagnosis data indicating the time at the end of the previous microframe not used for USB transactions.

47. The method of claim 46, further comprising:
using said end-of-microframe dead time diagnosis data to control the number of asynchronously scheduled descriptors that are prefetched based on their estimated time to complete.

48. The method of claim 33, wherein said data for controlling the operation of the USB host controller comprises time accounting diagnosis data indicating an estimated completion time of all asynchronously scheduled transfers of the previous microframe that are stored in a queue but not executed.

49. The method of claim 33, wherein said data for controlling the operation of the USB host controller comprises maximum time diagnosis data indicating a maximum value for an estimated completion time of asynchronously scheduled transfers of the previous microframe.

50. The method of claim 33, wherein said data for controlling the operation of the USB host controller comprises minimum time diagnosis data indicating a minimum value for an estimated completion time of asynchronously scheduled transfers of the previous microframe.

51. The method of claim 33, wherein said data for controlling the operation of the USB host controller comprises time accounting diagnosis data indicating an estimated completion time of all enqueued transfers of the current microframe.

52. The method of claim 33, wherein said data for controlling the operation of the USB host controller comprises threshold diagnosis data indicating an estimated completion time threshold value used to control the number of asynchronously scheduled descriptors that are prefetched based on their estimated time to complete.

53. The method of claim 33, further comprising:
storing fetched descriptors in a descriptor storage unit of the USB host controller,
wherein said data for controlling the operation of the USB host controller comprises flush diagnosis data instructing the USB host controller to flush the stored descriptors.

54. The method of claim 33, further comprising:
storing fetched descriptors in a descriptor storage unit of the USB host controller,
wherein said data for controlling the operation of the USB host controller comprises
diagnosis data indicating operational parameters of said descriptor storage unit.

55. The method of claim 33, further comprising:
storing prefetched descriptors in a descriptor cache of the USB host controller,
wherein said data for controlling the operation of the USB host controller comprises flush diagnosis data instructing the USB host controller to flush the stored descriptors.

56. The method of claim 33, further comprising:
storing prefetched descriptors in a descriptor cache of the USB host controller,
wherein said data for controlling the operation of the USB host controller comprises diagnosis data indicating the number of currently cached descriptors.

57. The method of claim 33, wherein said data for controlling the operation of the USB host controller comprises flush diagnosis data instructing the USB host controller to flush at least one FIFO (First in First Out) buffer in a transmit and receive engine of the USB host controller.

58. The method of claim 33, wherein said data for controlling the operation of the USB host controller comprises diagnosis data indicating the current number of bytes in at least one FIFO (First In First Out) buffer in a transmit and receive engine of the USB host controller.

59. The method of claim 33, further comprising:
storing debug control data in at least one debug register for controlling the USB host controller in a debug mode.

60. The method of claim 33, further comprising:
monitoring a clock used for handling the data traffic to and from said at least one USB device.

61. The method of claim 60, wherein said monitored clock is a USB device reference clock.

62. The method of claim 60, wherein said monitored clock is a PLL (Phase Locked Loop) output clock.

63. The method of claim 60, further comprising:
monitoring a PLL (Phase Locked Loop) lock signal.

64. A method of operating a host controller for controlling the data traffic to and from at least one peripheral device connected to a computer system over a serial bus, the host controller having a register set, the method comprising:
storing data indicative of operational capabilities of the host controller in at least one host controller capability register; and
storing data for controlling the operation of the host controller in at least one host controller operational register, wherein said data indicative of operational capabilities comprises data indicative of available diagnostic modes that the host controller can enter, wherein said data for controlling the operation of the host controller comprises diagnosis data for controlling the operation of the host controller in diagnostic modes, and wherein said at least one host controller capability register is configured to store a single step mode flag indicating that one of said available diagnostic modes of the host controller is a single step mode in which the host controller is forced to process a single transaction at a time.

65. A computer system comprising a host controller for controlling data traffic to and from at least one peripheral device connected to the computer system over a serial bus, the host controller having a register set comprising:

at least one host controller capability register configured to store data indicative of operational capabilities of the host controller; and at least one host controller operational register configured to store data for controlling the operation of the host controller, wherein said at least one host controller capability register is configured to store data indicative of available diagnostic modes that the host controller can enter, wherein said at least one host controller operational register is configured to store diagnosis data for controlling the operation of the host controller in diagnostic modes and wherein said at least one host controller capability register is configured to store a single step mode flag indicating that one of said available diagnostic modes of the host controller is a single step mode in which the host controller is forced to process a single transaction at a time.

* * * * *